US009462547B2

(12) United States Patent
Zhang et al.

(10) Patent No.: US 9,462,547 B2
(45) Date of Patent: Oct. 4, 2016

(54) METHOD FOR TRANSMITTING DATA USING TAIL TIME IN CELLULAR NETWORK

(71) Applicant: TSINGHUA UNIVERSITY, Beijing (CN)

(72) Inventors: Yaoxue Zhang, Beijing (CN); Di Zhang, Beijing (CN); Yuezhi Zhou, Beijing (CN); Hao Liu, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 384 days.

(21) Appl. No.: 14/128,567

(22) PCT Filed: Aug. 1, 2013

(86) PCT No.: PCT/CN2013/080608
§ 371 (c)(1),
(2) Date: Dec. 20, 2013

(87) PCT Pub. No.: WO2014/180070
PCT Pub. Date: Nov. 13, 2014

(65) Prior Publication Data
US 2015/0208344 A1 Jul. 23, 2015

(30) Foreign Application Priority Data
May 5, 2013 (CN) .......................... 2013 1 0161545

(51) Int. Cl.
*H04W 76/06* (2009.01)
*H04W 52/02* (2009.01)
(Continued)

(52) U.S. Cl.
CPC ........ *H04W 52/0209* (2013.01); *H04L 47/245* (2013.01); *H04L 47/56* (2013.01);
(Continued)

(58) Field of Classification Search
CPC .............. H04L 43/16; H04W 76/068; H04W 52/0251
USPC ........................ 370/310, 465, 467; 455/67.11
See application file for complete search history.

(56) References Cited

U.S. PATENT DOCUMENTS 9,374,824 B2 * 6/2016 Gerber ................ H04W 72/048
2006/0109846 A1 5/2006 Lioy et al.
(Continued)

FOREIGN PATENT DOCUMENTS

CN 103037391 A 4/2013
CN 103269513 A 8/2013

OTHER PUBLICATIONS

Liu et al.; "TailTheft: Leveraging the Wasted Time for Saving Energy in Cellular Communications"; Dept. of Computer Sci. and Tech.; MobiArch; Jun. 28, 2011; p. 31-36.
(Continued)

*Primary Examiner* — Wutchung Chu
(74) *Attorney, Agent, or Firm* — Baker & Hostetler LLP

(57) ABSTRACT

A method for transmitting data using a tail time in a cellular network comprising steps of: receiving a data transmission request from a mobile terminal, and inserting the data transmission request into a real-time request queue or a delay-tolerant request queue according to a type of the data transmission request; determining a tail time according to a state of a RRC state machine and a throughput of the mobile terminal; and obtaining the data transmission request to be transmitted from the real-time request queue or the delay-tolerant request queue, and transmitting the real-time data transmission request directly as there are real-time data transmission requests in the real-time request queue, and transmitting the delay-tolerant data transmission request using the tail time when the tail time is available for transmitting data or transmitting the delay-tolerant data transmission request directly when a deadline of the delay-tolerant data transmission request is approached.

14 Claims, 6 Drawing Sheets

(51) Int. Cl.
   *H04W 72/12*     (2009.01)
   *H04W 28/02*     (2009.01)
   *H04L 12/851*    (2013.01)
   *H04L 12/875*    (2013.01)
   *H04L 12/865*    (2013.01)
   *H04L 12/863*    (2013.01)
   *H04W 74/00*     (2009.01)

(52) U.S. Cl.
   CPC ....... *H04L 47/6215* (2013.01); *H04L 47/6275* (2013.01); *H04W 28/0205* (2013.01); *H04W 52/0216* (2013.01); *H04W 72/1263* (2013.01); *H04W 52/0206* (2013.01); *H04W 74/004* (2013.01); *Y02B 60/50* (2013.01)

(56) References Cited

U.S. PATENT DOCUMENTS

2012/0052814 A1*  3/2012  Gerber ............... H04W 72/048
                                                    455/67.11
2012/0151041 A1*  6/2012  Gerber ............... H04L 43/0876
                                                      709/224
2012/0324041 A1*  12/2012 Gerber .................. H04L 67/26
                                                      709/217

OTHER PUBLICATIONS

International Patent Application No. PCT/CN2013/080608; International Search Report; dated Feb. 20, 2014; 12 pages; No English Translation Available at this time.

* cited by examiner

METHOD FOR TRANSMITTING DATA USING TAIL TIME IN CELLULAR NETWORK

CROSS-REFERENCE TO RELATED APPLICATIONS

This application is the National Stage of International Application No. PCT/CN2013/080608, filed Aug. 1, 2013, which claims the benefit of Chinese Patent Application No. 201310161545.6, filed May 5, 2013, the disclosures of which are incorporated herein by reference in their entireties.

TECHNICAL FIELD

The present disclosure generally relates to a computer network communication field, and more particularly to a method for transmitting data using a tail time in a cellular network.

BACKGROUND

With the development of society and technology, mobile terminals such as mobile phones are used more and more widely. Among numerous mobile phones, smart phones based on operating systems such as Android and iOS (the operating system for handheld devices developed by Apple Inc.) become more and more popular, which provide a variety of applications for users, thus making the life and work of users more convenient. A big problem of mobile terminals such as smart phones is the limited battery life, which does not only affect user experience, but also constrains the emergence of more attractive and complex applications.

In cellular networks, it has already been proved that radio resources shared among mobile terminals consume the most battery energy of mobile terminals. However, more than 60% of the energy consumed by radio resources is derived from the timeout periods of inactivity timers. The inactivity timers are configured to control the release of radio resources. Accordingly, the timeout period of inactivity timers is referred to as the tail time. The tail time is adopted to seek a balance between radio resources, user experience, energy consumption and network overhead. However, the tail time results in the wastage of radio resources and battery energy of mobile terminals. Taking the 3G network and the Universal Mobile Telecommunications System (UMTS) as an example, in order to use the limited radio resources more effectively, the UMTS adopts a Radio Resource Control (RRC) protocol. The RRC protocol maintains a common state machine for both the mobile terminal and Radio Network Controller (RNC). In different states of the RRC state machine, the mobile terminal consumes different levels of battery energy. Before data is transmitted, the state of the RRC state machine is promoted to a high power state. It should be noted that the state promotion does not only consume energy, but also brings a certain delay to the user. When the data transmission is completed, the state of the RRC state machine is not demoted to a low power state immediately. Instead, the RRC state machine waits for a certain duration (the tail time, which is reaches up to 15 seconds) according to the inactivity timers. During this period, there is no data transmission, but the mobile terminal is still in the high power state, thus wasting battery energy of the mobile terminal.

FIG. 1 shows an overview of the RRC state machine of the UMTS. The RRC state machine has three different states which are the dedicated channel state, the forward access channel state and the idle state. The dedicated channel state and the forward access channel state are in a connection state, and under which the mobile terminal is able to transmit data. However, the mobile terminal is unable to transmit data under the idle state. In addition, the three different states correspond to different levels of energy consumption, in which the dedicated channel state consumes the most energy. When the mobile terminal has data to be transmitted or received, the RRC state machine promotes from the idle state to the dedicated channel state. As this state promotion process needs to apply for resource from the RNC, a certain time (promotion time, which is about 2 seconds) is consumed. After the data are transmitted, the RNC starts an inactivity timer α (corresponding to time $T_1$). When the timer α is timeout, the RRC state machine is demoted from the dedicated channel state to the forward access channel state. In the forward access channel state, when either the uplink buffer or the downlink buffer exceeds a threshold set by the RNC, the state of the RRC state machine will be promoted from the forward access channel state to the dedicated channel state. If there is still no data transmission in the forward access channel state, the RNC will start another inactivity timer β (corresponding to time $T_2$). When the timer β is timeout, the state of the RRC state machine will be demoted to the idle state. Furthermore, it is possible to demote from the dedicated channel state to the idle state by an operation which is called fast dormancy.

In order to solve the problem that the tail time in cellular networks causes waste of battery energy of mobile terminals, investigators proposed a plurality of optimization methods. According to the difference in dealing the tail time, these optimization methods can be classified into two types: traffic aggregation method and tail time tuning method. The traffic aggregation method aggregates small transmissions into a large continuous transmission according to the traffic patterns of transmissions so as to reduce the occurrence number of the tail time and the energy consumption for transmitting data. One example of the traffic aggregation method is TailEnder (refer to Naianjan Balasubramanian. etc, "Power Consumption in Mobile Phones: A Measurement Study and Implications for Network Applications", 2009, Internet Measurement Conference). For delay-tolerant applications (such as e-mails and RSS) and prefetchable applications (such as news and videos), the traffic aggregation method can aggregate traffic by deferring and prefetching. However, when the prefetching accuracy of the prefetchable applications is very low, the traffic aggregation method not only does not reduce the energy consumption, but increases the energy consumption. For example, when only a very small portion of prefetched data is necessary for prefetchable applications, the traffic aggregation method only reduces a very small portion of the tail time, but consumes great power for the prefetching operation itself. The tail time tuning method is desirable to seek a balance between the energy consumption in the tail time and the delays brought by state promotions of different RRC states. Most of these tail time tuning methods are desirable to find an appropriate length of the tail time. However, even if an appropriate length of the tail time is set, the tail time still exists and brings considerable energy wastage. One recently proposed tail time tuning method is TOP (refer to Feng Qian, etc, "TOP: Tail Optimization Protocol for Cellular Radio Resource Allocation", 2010, IEEE International Conference on Network Protocols), which takes advantage of a feature called fast dormancy to dynamically terminate the tail time. When TOP predicts that there is no data needed to be transmitted in a period of time in the future, it quickly demotes the state of the RRC state machine to the low power state. However, the effectiveness of TOP depends on the accuracy of the prediction of future traffic patterns. Low prediction accuracy brings extra state promotions, thus bringing more waste of battery energy of mobile terminals.

In conclusion, the tail time in cellular networks consumes a large portion of battery energy of mobile terminals, and the battery life of mobile terminals can be improved by optimizing the tail time. However, in some cases, the previously proposed methods for optimizing the tail time not only cannot save battery energy, but increase energy consumption of mobile terminals.

SUMMARY

Embodiments of the present disclosure seek to solve at least one of the problems existing in the prior art to at least some extent.

One objective of the present disclosure is to provide a method for transmitting data using a tail time in a cellular network. By using the tail time effectively, the method not only can realize a better energy conservation effect and prolong the battery life (refer to the time the mobile terminal will run before it must be recharged) of mobile terminals effectively, but also overcome the defect of causing more energy wastage in the prior arts.

The present disclosure is mainly based on the principle that the tail time wastes a lot of battery energy of mobile terminals, and if this idle tail time is used, the battery life of mobile terminals can be prolonged effectively. In the present disclosure, a term of "request scheduling" refers to adjusting the transmission time and sequence of a data transmission request. When a data transmission request is received from the mobile terminal, it is transmitted after being processed. In the mobile terminal, a large portion of data transmission requests are delay-tolerant (such as, e-mail sending requests) and prefetchable (such as, news items). This portion of data transmission requests can be scheduled to the tail time by deferring and prefetching, thus taking advantage of the tail time.

The present disclosure takes advantage of the idle tail time to transmit delay-tolerant and prefetching data, so as to save the energy consumption of mobile terminals (such as mobile phones) during the data communication process, and thereby effectively prolong the battery life of mobile terminals. The present method can save the battery energy of mobile terminals. This is because: (1) the idle tail time is effectively used; (2) the deferring and prefetching operations can reduce the total time for transmitting data and the occurrence number of state promotions. Since the delay-tolerant or prefetching data is transmitted using the idle tail time, even if when the accuracy of the prefetching operation is very low, the present method will not bring an increment to the energy consumption, thus effectively overcoming the risk of increasing energy consumption.

The method for transmitting data using the tail time in the cellular network according to the present disclosure realize the data transmission during the tail time. The method receives data transmission requests continuously from the mobile terminal, and inserts each data transmission request into the real-time request queue or the delay-tolerant request queue according to the type of each data transmission request. Then, the method determines the tail time according to the state of the RRC state machine and the throughput of the mobile terminal, and obtains one data transmission request to be transmitted from the real-time request queue or the delay-tolerant request queue according to the type of data transmission request, and transmits the data transmission request to the cellular network.

In the present method, the data transmission requests from the mobile terminal are classified into two types: the real-time request and the delay-tolerant request. The delay-tolerant request comprises the delay-tolerant request of the delay-tolerant application and the prefetching request of the prefetchable application (since the prefetching operation can be delayed according to actual requirements, the prefetching time of the prefetching request is delay-tolerant. Therefore, the prefetching request of prefetchable application is classified into the delay-tolerant request).

The present method realizes the classification of the requests by modifying the data transmission request submission interface of the mobile terminal. Specifically, two parameters are added in the original interface, which are the type and delay-tolerant time of the data transmission request.

The present method sets three timers $\theta$, $\gamma$ and $\delta$. Each of the three timers has three states: an un-started state, a started but not timeout state and a timeout state. The timer $\theta$ is configured to ensure that the delay-tolerant request is transmitted before its deadline. The timer $\gamma$ and the timer $\delta$ are corresponding to the dedicated channel state and the forward access channel state of the RRC state machine respectively, and are configured to judge whether the tail time is available for transmitting data.

The method for transmitting data using the tail time in the cellular network presented by the present disclosure uses the tail time for data transmission, and comprises the following steps of: step 1, receiving a data transmission request from a mobile terminal, and inserting the data transmission request into a real-time request queue or a delay-tolerant request queue according to a type of the data transmission request; step 2, determining a tail time according to a state of a RRC state machine and a throughput of the mobile terminal; and step 3, obtaining the data transmission request to be transmitted from the real-time request queue or the delay-tolerant request queue, and transmitting the real-time data transmission request directly as there are data transmission requests in the real-time request queue, and transmitting the delay-tolerant data transmission request using the tail time when the tail time is available for transmitting data or transmitting the delay-tolerant data transmission request directly when the deadline of the delay-tolerant data transmission request is approached.

In one embodiment of the present disclosure, the data transmission request comprises the real-time request and the delay-tolerant request, the delay-tolerant request comprises the delay-tolerant request of the delay-tolerant application and the prefetching request of the prefetchable application. The type and the delay-tolerant time of the data transmission request are added in the data transmission request submission interface of the mobile terminal so as to classify the data transmission requests.

In one embodiment of the present disclosure, the method further comprises: setting three timers $\theta$, $\gamma$ and $\delta$, in which each of the three timers has three states: an un-started state, a started but not timeout state and a timeout state, the timer $\theta$ is configured to ensure that the delay-tolerant request in the delay-tolerant request queue is transmitted before its deadline, the timer $\gamma$ and the timer $\delta$ are corresponding to a dedicated channel state and a forward access channel state of the RRC state machine respectively, and are configured to determine the tail time and to judge whether the tail time is available for transmitting data.

In one embodiment of the present disclosure, the data transmission request comprises data to be transmitted, the type and delay-tolerant time of the data transmission request, and the step 1 comprises the following steps: step 11, judging whether the type of the data transmission request is the real time request when the data transmission request is received, and if yes, executing step 12, and if no, executing step 13; step 12, inserting the data transmission request into the tail of the real-time request queue; step 13, judging whether the timer θ is started, and if yes, executing step 14, and if no, executing step 15; step 14, stopping the timer θ and then executing step 15; step 15, obtaining the deadline of the data transmission request according to the delay-tolerant time of the data transmission request and the current time, and inserting the data transmission request into the delay-tolerant request queue in accordance with the deadlines of the data transmission requests in the delay-tolerant request queue; step 16, obtaining the data transmission request at the head of the delay-tolerant request queue, and starting the timer θ according to the deadline of the data transmission request at the head of the delay-tolerant request queue to update the timer θ.

In one embodiment of the present disclosure, the method further comprises: sending two data packets intermittently to obtain parameters including the throughput threshold triggering state promotion from the dedicated channel state to the forward access channel state, the threshold of the uplink buffer, the threshold of the downlink buffer, the buffer consumption time of the uplink buffer and the buffer consumption time of the downlink buffer.

In one embodiment of the present disclosure, the step 2 comprises the following steps: updating the timer γ and the timer δ according to the state of the RRC state machine and the throughput of the mobile terminal; and determining the tail time according to the timer γ and the timer δ.

In one embodiment of the present disclosure, the step 2 comprises the following steps: step 21, obtaining the current state of the RRC state machine according to the current power of the mobile terminal; step 22, judging whether the current state of the RRC state machine is the dedicated channel state, and if yes, executing step 23, and if no, executing step 28; step 23, judging whether the current throughput of the mobile terminal is less than the throughput threshold triggering state promotion from the dedicated channel state to the forward access channel state, and if yes, executing step 24, and if no, executing step 26; step 24, judging whether the timer γ is started, and if yes, executing step 214, and if no, executing step 25; step 25, starting the timer γ and then executing step 214; step 26, judging whether the timer γ is started, and if yes, executing step 27, and if no, executing step 214; step 27, stopping the timer γ and then executing step 214; step 28, judging whether the current state of the RRC state machine is the forward access channel state, and if yes, executing step 29, and if no, executing step 214; step 29, judging whether the current throughput of the mobile terminal is zero, and if yes, executing step 210, and if no, executing step 212; step 210, judging whether the timer δ is started, and if yes, executing step 214, and if no, executing step 211; step 211, starting the timer δ and then executing step 214; step 212, judging whether the timer δ is started, and if yes, executing step 213, and if no, executing step 214; step 213, stopping the timer δ and then executing step 214; step 214, delaying for a first preset time and then returning to step 21, in which a period after starting and before timeout of the timer γ and a period after starting and before timeout of the timer δ is the tail time.

In one embodiment of the present disclosure, the step 3 comprises the following steps: step 31, judging whether the timer θ is started, and if yes, executing step 32, and if no executing step 34; step 32, judging whether the timer θ is timeout, and if yes, executing step 33, and if no, executing step 34; step 33, processing the data transmission request at the head of the delay-tolerant request queue; step 34, judging whether the real-time request queue has data transmission request, and if yes, executing step 35, and if no, executing step 36; step 35, fetching the data transmission request at the head of the real-time request queue and transmitting this data transmission request to the cellular network, and then returning to step 31; step 36, judging whether the tail time is available for transmitting data, and if yes, executing step 37, and if no, returning to step 31; step 37, scheduling the data transmission request in the delay-tolerant request queue to the tail time for transmission and then returning to step 31.

In one embodiment of the present disclosure, processing the data transmission request at the head of the delay-tolerant request queue in step 33 comprises the following steps: step 331, obtaining the data transmission request at the head of the delay-tolerant request queue; step 332, judging whether the data transmission request at the head of the delay-tolerant request queue is the prefetching request, and if yes, executing step 333, and if no, executing step 334; step 333, discarding the data transmission request at the head of the delay-tolerant request queue and then executing step 335; step 334, transmitting the data transmission request at the head of the delay-tolerant request queue to the cellular network and then executing step 335; step 335, restarting the timer θ according to the deadline of the present data transmission request at the head of the delay-tolerant request queue, and then returning to step 331.

In one embodiment of the present disclosure, judging whether the tail time is available for transmitting data comprises the following steps: step 361, obtaining the current state of the RRC state machine according to the current power of the mobile terminal; step 362, judging whether the current state of the RRC state machine is the dedicated channel state, and if yes, executing step 363, and if no, executing step 364; step 363, judging whether the timer γ is started, and if yes, executing step 366, and if no, returning to step 31; step 364, judging whether the current state of the RRC state machine is the forward access channel state, and if yes, executing step 365, and if no, returning to step 31; step 365, judging whether the timer δ is started, and if yes, executing step 366, and if no, returning to step 31; step 366, judging whether the current throughput of the mobile terminal is zero, and if yes, executing step 37, and if no, returning to step 31.

In one embodiment of the present disclosure, scheduling the data transmission request in the delay-tolerant request queue to the tail time for transmission comprises the following steps: step 371, judging whether the delay-tolerant request queue has a data transmission request, and if yes, executing S373, and if no, executing S372; step 372, delaying for a second preset time and then calling fast dormancy; step 373, stopping the timer θ; step 374, obtaining the current state of the RRC state machine according to the current power of the mobile terminal; step 375, judging whether the current state of the RRC state machine is the dedicated channel state, and if yes, executing step 376; step 376, scheduling the data transmission request to the tail time under the dedicated channel state.

In one embodiment of the present disclosure, scheduling the data transmission request to the tail time under the dedicated channel state comprises the following steps: step 3761, judging whether the timer γ is timeout, and if no, executing step 3762; and step 3762, obtaining the data transmission request at the head of the delay-tolerant request queue, and transmitting the data transmission request at the head of the delay-tolerant request queue to the cellular network.

In one embodiment of the present disclosure, the method further comprises: step 377, judging whether the current state of the RRC state machine is the forward access channel state when the current state of the RRC state machine is not the dedicated channel state, and if yes, executing step 3781; step 3781, judging whether the timer δ is timeout, and if no, executing step 3782; step 3782, obtaining the data transmission request at the head of the delay-tolerant request queue, transmitting the data transmission request at the head of the delay-tolerant request queue to the cellular network, and ensuring not to trigger a state promotion from the forward access channel state to the dedicated channel state.

In one embodiment of the present disclosure, the method further comprises the following step: restarting the timer θ according to the deadline of the data transmission request at the head of the delay-tolerant request queue after transmitting the data transmission request at the head of the delay-tolerant request queue to the cellular network.

In one embodiment of the present disclosure, the method further comprises: calling fast dormancy after a radio link control buffer is cleared when the timer γ or the timer δ is timeout.

The present disclosure has the following advantages:

With the present disclosure, by scheduling the delay-tolerant requests and the prefetching requests to the tail time during the cellular communication process, the idle tail time is used effectively, thus saving the battery energy of the mobile terminal.

Compared with the conventional methods, the method for transmitting data using the tail time in cellular networks provided by the present disclosure is able to achieve a better energy conservation effect. In addition, as the present disclosure schedules the application requests using the idle tail time, even if when the accuracy of the prefetching operation is very low, the method will not bring the increment to the energy consumption, thus effectively overcoming the risk of increasing energy consumption.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION OF ILLUSTRATIVE EMBODIMENTS

Figure 1:
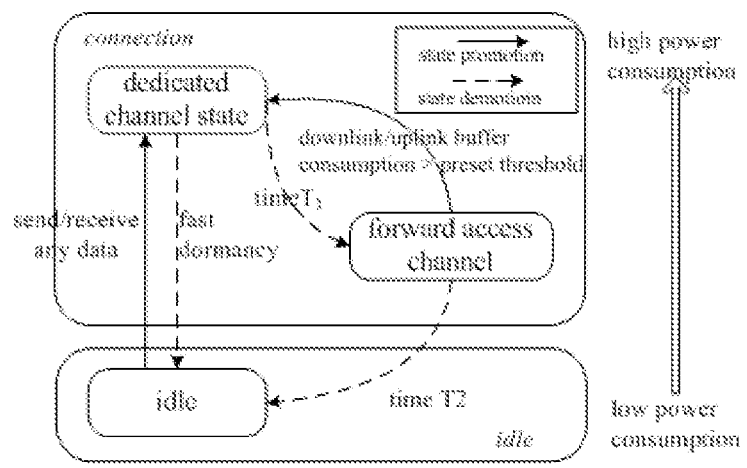
FIG. 1 is a schematic diagram of the RRC state machine of the Universal Mobile Telecommunication System.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it should be noticed that, terms such as "first" and "second" are used herein for purposes of description and are not intended to indicate or imply relative importance or significance. In the specification, the terms "mounted", "connected", "supported", and "coupled" and variations thereof are used broadly and encompass both direct and indirect mountings, connections, supports, and couplings. Further, "connected" and "coupled" are not restricted to physical or mechanical connections or couplings.

Any describe of the processes or method described in the flowing charts or the other ways should be understood to be module, part or portion comprising one or more steps configured to realized some special logical function or procedure, and the scope of the preferable embodiments of the present disclosure comprises other realization, in which the function is able to be executed no in accordance with the shown or discussed order comprising the same-time method or the opposite order according to the referred functions, which is able to be understood via referring the description and drawings by the technicians in these field and the some and other aspects of the embodiment of the present disclosure are clearly understood. Additional aspects and advantages of the embodiments of the present disclosure will be given in part in the following descriptions, become apparent in part from the following descriptions, or be learned from the practice of the embodiments of the present disclosure.

In the following, a method for transmitting data using a tail time in a cellular network according to embodiments of the present disclosure will be described in detail with reference to drawings.

Applications of the mobile terminals such as mobile phones comprise e-mail, news, videos, cloud storages, real-time communication, social networks, etc. Data of some applications such as news and cloud storages can be delayed. If the battery energy of the mobile phone can be effectively saved, a user is very happy to delay e-mails sending for a while. For some applications such as news, videos and social networks, it is possible to prefetch some potentially desired contents according to the user's habits. In the following, taking an Android mobile phone as one embodiment of the mobile terminal, taking e-mail as an example of the delay-tolerant application, and taking news as an example of the prefetchable application, the method for transmitting data using the tail time is explained.

In one embodiment of the present disclosure, the mobile phone is configured as follow:

hardware configuration: model: SAMSUNG Galaxy SIII; CPU: SAMSUNG Exynos 4412; RAM: 1 GB; ROM: 16 GB; networks type of 3G: WCDMA.

software configuration: Android 4.04.

It should be understood that, the above mobile phone is only illustrative for understanding embodiments of the present disclosure, but is not used to limit the scope of the present disclosure. It is easy for those skilled in the art to transmit data from mobile terminals (such as, mobile phones, tablet computers and personal assistants) with a variety of configurations according to the method of the present disclosure.

According to the method of the present disclosure, the data transmission requests from the mobile terminal are classified into two types, one is the real-time request and the other is the delay-tolerant request. The delay-tolerant request comprises the delay-tolerant request of the delay-tolerant application and the prefetching request of the prefetchable application. In one embodiment, the delay-tolerant application is e-mail, and the prefetchable application is news. Therefore, the delay-tolerant request comprises the e-mail data transmission request and the news data transmission request. The real-time request is the other data transmission request except the delay-tolerant request. A delay-tolerant time of the e-mail data transmission request can be set according to the user's requirement, and different delay-tolerant time can lead to different energy conservation effects. In one embodiment, the delay-tolerant time of the e-mail data transmission request is set to be 30 minutes. The news data is prefetched periodically, and the prefetching time period can be set according to the time when the user watches news. In one embodiment of the present disclosure, there are three prefetching time periods: 7 a.m. to 8 a.m., 12 noon to 1 p.m. and 6 p.m. to 7 p.m.

The method according to the present disclosure realizes the classification of the requests by modifying the data transmission request submission interface of the mobile terminal. Taking the Android operating system as an example, a type r_type and a delay-tolerant time r_delay of the data transmission request are added in the data transmission request submission interface, in which the initial values of the r_type and the r_delay are set to be zero respectively. For the delay-tolerant request of delay-tolerant applications, the r_type is set to be 1, and the r_delay is set to be the delay-tolerant time; for the prefetchable applications, the r_type is set to be −1, and the r_delay is set to be the duration of the prefetching time period.

In one embodiment of the present disclosure, three timers $\theta$, $\gamma$ and $\delta$ are set. Each of the three timers has three states: an un-started state, a started but not timeout state and a timeout state. The timer $\theta$ is configured to ensure that the delay-tolerant request is transmitted before the deadline, and the timer $\gamma$ and the timer $\delta$ are corresponding to the dedicated channel state and the forward access channel state of the RRC state machine respectively, and are configured to judge whether the tail time is available for transmitting data.

Figure 2:
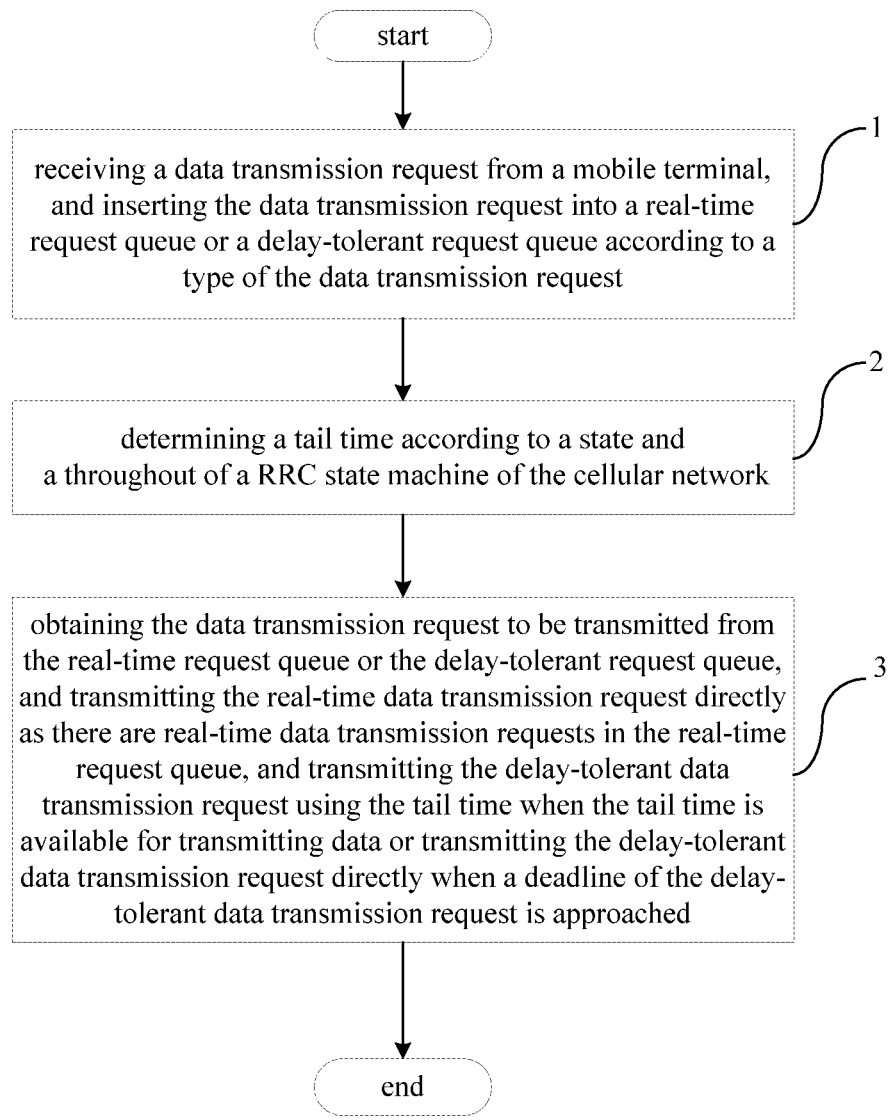
FIG. 2 is a flow chart of a method for transmitting data using a tail time in a cellular network according to an embodiment of the present disclosure.

FIG. 2 is a flow chart of a method for transmitting data using a tail time in a cellular network according to an embodiment of the present disclosure. As shown in FIG. 2, the method comprises the following steps.

At step 1, a data transmission request is received from the mobile terminal, and the data transmission request is inserted into the real-time request queue or the delay-tolerant request queue according to the type of the data transmission request.

Specifically, the type of the data transmission request comprises the real-time request and the delay-tolerant request. The delay-tolerant request comprises the delay-tolerant request of the delay-tolerant application and the prefetching request of the prefetchable application. The type and the delay-tolerant time of the data transmission request are added in the data transmission request submission interface of the mobile terminal so as to classify the data transmission requests.

At step 2, the tail time is determined according to the state of the RRC state machine and the throughput of the mobile terminal.

At step 3, the data transmission request to be transmitted is obtained from the real-time request queue or the delay-tolerant request queue, and the real-time data transmission request is transmitted directly when there are real-time data transmission requests in the real-time request queue, and the delay-tolerant transmission request is transmitted using the tail time when the tail time is available for transmitting data or is transmitted directly when the deadline of the delay-tolerant request is approached.

Specifically, in one embodiment of the present disclosure, the method further comprises the step of setting three timers $\theta$, $\gamma$ and $\delta$. Each of the three timers has three states: an un-started state, a started but not timeout state and a timeout state, the timer $\theta$ is configured to ensure that the delay-tolerant request in the delay-tolerant request queue is transmitted before its deadline, and the timer $\gamma$ and the timer $\delta$ are corresponding to the dedicated channel state and the forward access channel state of the RRC state machine respectively, and are configured to determine the tail time and to judge whether the tail time is available for transmitting data.

Specifically, in one embodiment of the present disclosure, the method further comprises the step of sending two data packets intermittently to obtain the following parameters (refer to Feng Qian, etc, "Profiling Resource Usage for Mobile Applications: A Cross-layer Approach", 2011, The International Conference on Mobile Systems, Applications, and Services): the throughput threshold triggering state promotion from the dedicated channel state to the forward access channel state, the threshold of the uplink buffers, the threshold of the downlink buffer, the buffer consumption time of the uplink buffer and the buffer consumption time of the downlink buffer. The parameters obtained by sending two data packets according to one embodiment are shown as in Table 1.

TABLE 1

| Obtained parameters | |
| --- | --- |
| Item | Value (d is a size of the data to be transmitted) |
| Throughput threshold triggering state promotion from the dedicated channel state to the forward access channel state | 8 kbps |
| Threshold of the uplink buffer | 540 bytes |
| Threshold of the downlink buffer | 475 bytes |
| Buffer consumption time of the uplink buffer | $0.0015 d^2 + 1.5 d + 20$ ms |
| Buffer consumption time of the downlink buffer | $0.1 d + 10$ ms |

Figure 3:
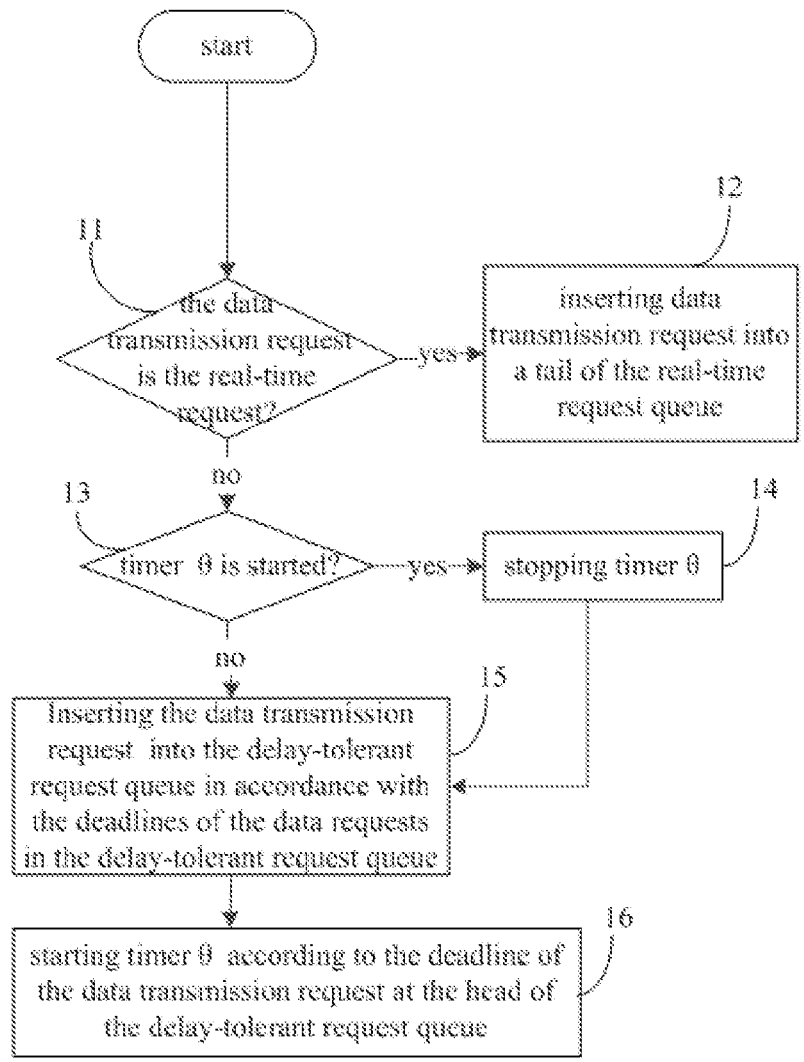
FIG. 3 is a flow chart of receiving a data transmission request from a mobile terminal according to an embodiment of the present disclosure.

In the above step 1, data transmission requests are continuously received from the mobile terminal, and when one data transmission request is received, it is inserted into the real-time request queue or the delay-tolerant request queue according to its type. Specifically, as shown in FIG. 3, the step 1 comprises the following steps.

At step 11, it is judged whether the type of the data transmission request is the real-time request when the data transmission request is received, if yes, execute step 12, and if no, execute step 13.

Specifically, when the data transmission request is received, the data type r_type and the delay-tolerant time r_delay of the data transmission request are obtained. Table 2 presents three different types of data transmission requests in one embodiment of the present disclosure. It should be understood that, the delay-tolerant time will change according to the specific configuration of the mobile terminal and the cellular network.

TABLE 2

Three different types of data transmission request

| Request type | Data type | r_type | r_delay (second) |
|---|---|---|---|
| Delay-tolerant | E-mail data | 1 | 1800 |
| Prefetching | News data | −1 | 3600 |
| Real-time | Else | 0 | 0 |

The type of the data transmission request is determined according to the value of the data type r_type, if the value of the data type r_type is 0, the data transmission request is the real-time request; if the value of the data type r_type is not 0, i.e. is −1 or 1, the data transmission request is the delay-tolerant request.

At step 12, the data transmission request is inserted into the tail of the real-time request queue and then execute step 11.

At step 13, it is judged whether the timer $\theta$ is started, if yes, execute step 14, and if no, execute step 15.

At step 14, the timer $\theta$ is stopped and then execute step 15.

At step 15, the deadline of the data transmission request is obtained according to the delay-tolerant time of the data transmission request (for example, 1800s or 3600s shown in the above Table 2) and the current time, and the data transmission request is inserted into the delay-tolerant request queue in accordance with the deadline of the data transmission request in the delay-tolerant request queue.

Specifically, the data transmission requests in the delay-tolerant request queue may be re-ordered according to the deadline of each data transmission request. After re-ordering, the currently received data transmission request can be inserted into the delay-tolerant request queue in accordance with the deadlines of the currently received data transmission request and the data transmission requests in the delay-tolerant request queue from small to large.

At step 16, the data transmission request at the head of the delay-tolerant request queue is obtained, and the timer $\theta$ is started according to the deadline of the data transmission request at the head of the delay-tolerant request queue to update the timer $\theta$.

Figure 4:
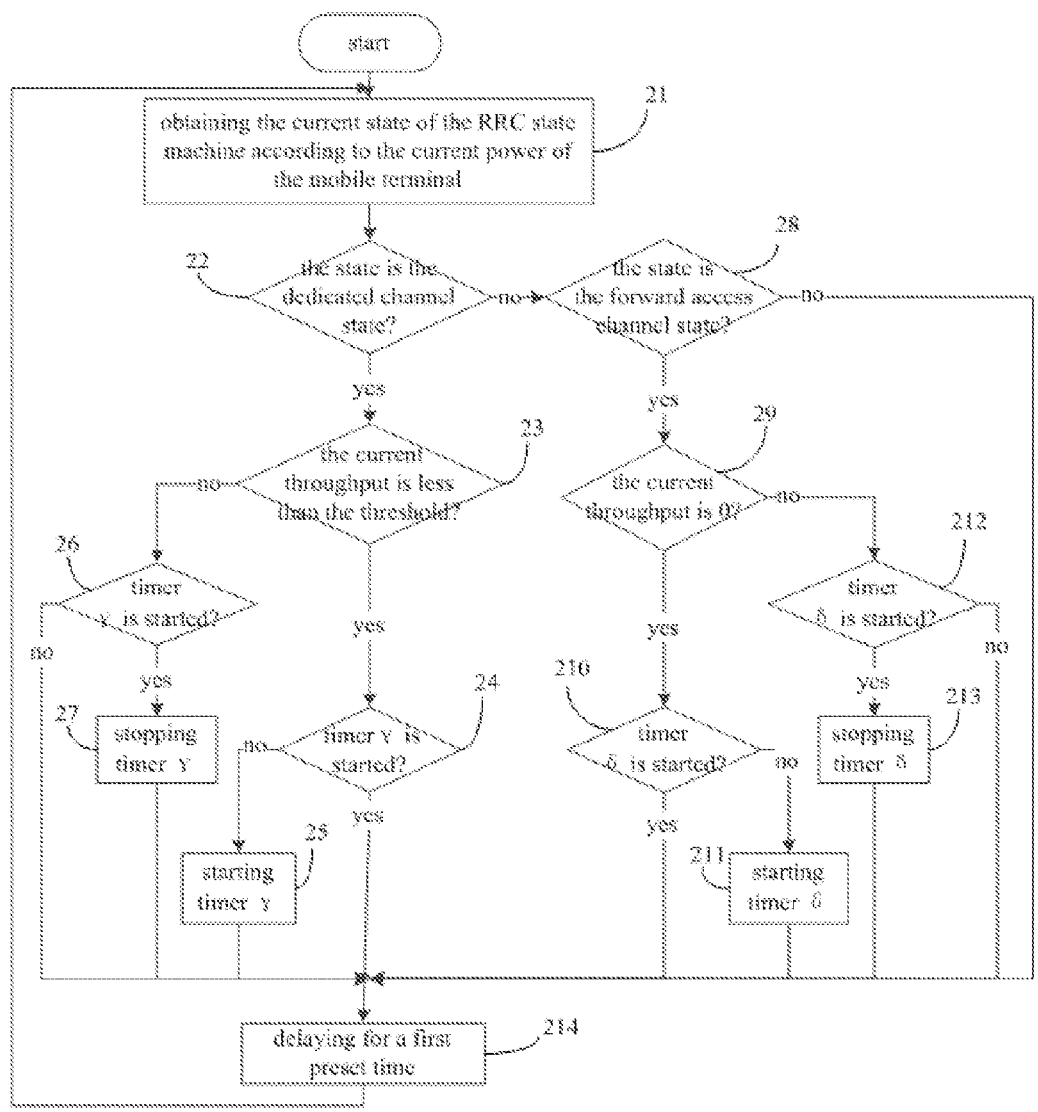
FIG. 4 is a flow chart of updating timers γ and δ according to an embodiment of the present disclosure.

In the above step 2, the tail time is determined according to the state of the RRC state machine and the throughput of the mobile terminal. Specifically, the timer $\gamma$ and the timer $\delta$ are updated according to the state of the RRC state machine and the throughput of the mobile terminal, and then the tail time is determined according to the timer $\gamma$ and timer $\delta$. More specifically, when the current state of the RRC state machine is the dedicated channel state and the current throughput of the mobile terminal is smaller than the throughput threshold, it is demonstrated that the dedicated channel state can be demoted, and the corresponding timer $\gamma$ is started; when the current state of the RRC state machine is the dedicated channel state but the current throughput is larger than or equal to the throughput threshold, it is demonstrated that the mobile terminal is processing data under the dedicated channel state, and the corresponding timer $\gamma$ is not started; when the current state of the RRC state machine is the forward access channel state, and the current throughput under the forward access channel state is 0, it is demonstrated that the forward access channel state can be demoted, and the corresponding timer $\delta$ is started; when the current state of the state machine is the forward access channel state but the current throughput is not 0, it is demonstrated that the mobile terminal is processing data under the forward access channel state, and the corresponding timer $\delta$ is not started. As shown in FIG. 4, the above step 2 comprises the following steps.

At step 21, the current state of the RRC state machine is obtained according to the current power of the mobile terminal.

At step 22, it is judged whether the current state of the RRC state machine is the dedicated channel state, and if yes, execute step 23, and if no, execute step 28.

At step 23, it is judged whether the current throughput of the mobile terminal is less than the throughput threshold triggering state promotion from the dedicated channel state to the forward access channel state, and if yes, execute step 24, and if no, execute step 26 is executed. For example, the throughput threshold triggering state promotion from the dedicated channel state to the forward access channel state may be the measured data shown in Table 1, i.e., 8 kbps.

At step 24, it is judged whether the timer $\gamma$ is started, and if yes, execute step 214, and if no, execute step 25.

At step 25, the timer $\gamma$ is started and then execute step 214.

At step 26, it is judged whether the timer $\gamma$ is started, and if yes, execute step 27, and if no, execute step 214.

At step 27, the timer $\gamma$ is stopped and then execute step 214.

At step 28, it is judged whether the current state of the RRC state machine is the forward access channel state, and if yes, execute step 29, and if no, execute step 214.

At step 29, it is judged whether the current throughput of the mobile terminal is zero, and if yes, execute step 210, and if no, execute step 212.

At step 210, it is judged whether the timer $\delta$ is started, and if yes, execute step 214, and if no, execute step 211.

At step 211, the timer $\delta$ is started and then execute step 214.

At step 212, it is judged whether the timer $\delta$ is started, and if yes, execute step 213, and if no, execute step 214.

At step 213, the timer $\delta$ is stopped and then execute step 214. At step 214, a first preset time is delayed and then return to step 21, in which a period after starting and before timeout of the timer $\gamma$ and a period after starting and before timeout of the timer $\delta$ is the tail time.

For example, the first preset time may be 0.5s.

Figure 5:
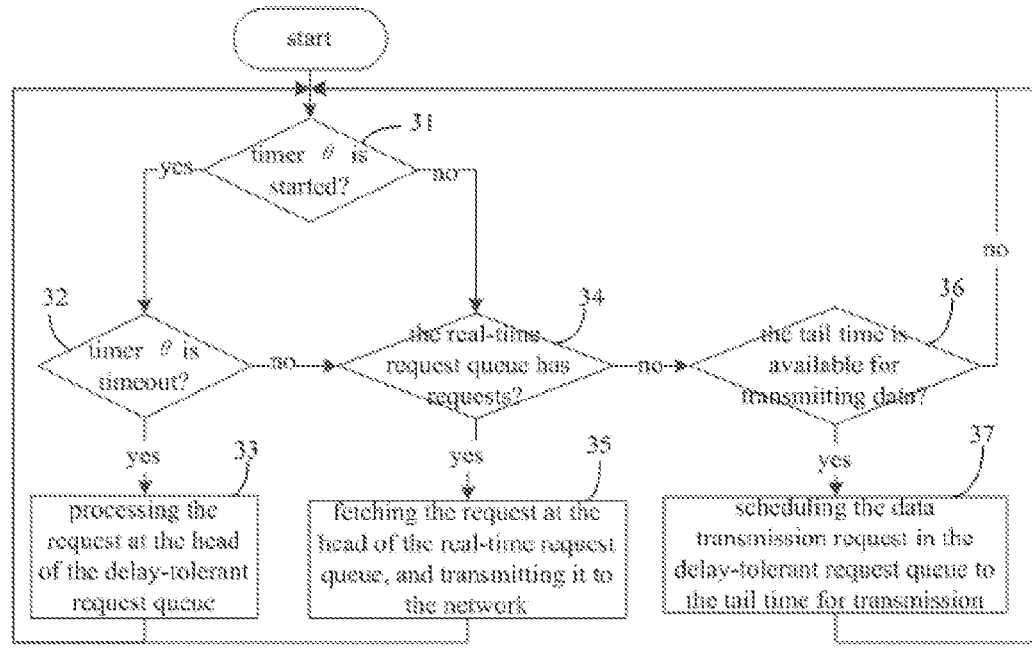
FIG. 5 is a flow chart of scheduling a data transmission request according to an embodiment of the present disclosure.

In the above step 3, the data transmission request to be transmitted is obtained from the real-time request queue or the delay-tolerant request queue, and the real-time data transmission request is transmitted directly when there are real-time data transmission requests in the real-time request queue, and the delay-tolerant data transmission request is transmitted using the tail time when the tail time is available for transmitting data or is transmitted directly when the deadline of the delay-tolerant request is approached. Specifically, when the timer $\theta$ is started and timeout, it is demonstrated that the deadline of the data transmission request at the head of the delay-tolerant queue has approached, and this data transmission request should be processed immediately; when the timer θ is started but not timeout, or when the timer θ is not started, it is further judged whether the real-time request queue has data transmission requests, if yes, the data transmission requests in the real-time request queue are processed, and if no, the data transmission request in the delay-tolerant request queue is transmitted using the tail time. As shown in FIG. 5, the step 3 comprises the following steps.

At step 31, it is judged whether the timer θ is started, and if yes, execute step 32, and if no, execute step 34.

At step 32, it is judged whether the timer θ is timeout, and if yes, execute step 33, and if no, execute step 34.

At step 33, the data transmission request at the head of the delay-tolerant request queue is processed, and then return to step 31.

Specifically, when the timer θ is timeout, the deadline of the data transmission request at the head of the delay-tolerant request queue has approached and this data transmission request is needed to be processed. Further, if the data transmission request at the head of the delay-tolerant request queue is the prefetching request, it is discarded, otherwise the data transmission request at the head of the delay-tolerant request queue is processed, and the timer θ is updated. More specifically, the step 33 comprises the following steps.

At step 331, the data transmission request at the head of the delay-tolerant request queue is obtained.

At step 332, it is judged whether the data transmission request at the head of the delay-tolerant request queue is the prefetching request, and if yes, execute step 333, and if no, execute step 334.

At step 333, the data transmission request at the head of the delay-tolerant request queue is discarded, and then execute step 335.

At step 334, the data transmission request at the head of the delay-tolerant request queue is transmitted to the cellular network and then execute step 335.

At step 335, the timer θ is restarted according to the deadline of the data transmission request at the head of the present delay-tolerant request queue, and then return to step 31.

At step 34, it is judged whether the real-time request queue has a data transmission request, and if yes, execute step 35, and if no, execute step 36.

At step 35, the data transmission request at the head of the real-time request queue is fetched and transmitted to the cellular network, and then return to step 31.

At step 36, it is judged whether the tail time is available for transmitting data and if yes, execute step 37, and if no, returned to step 31.

At step 37, the data transmission request in the delay-tolerant request queue is scheduled to the tail time for transmission and then return to step 31.

Figure 6:
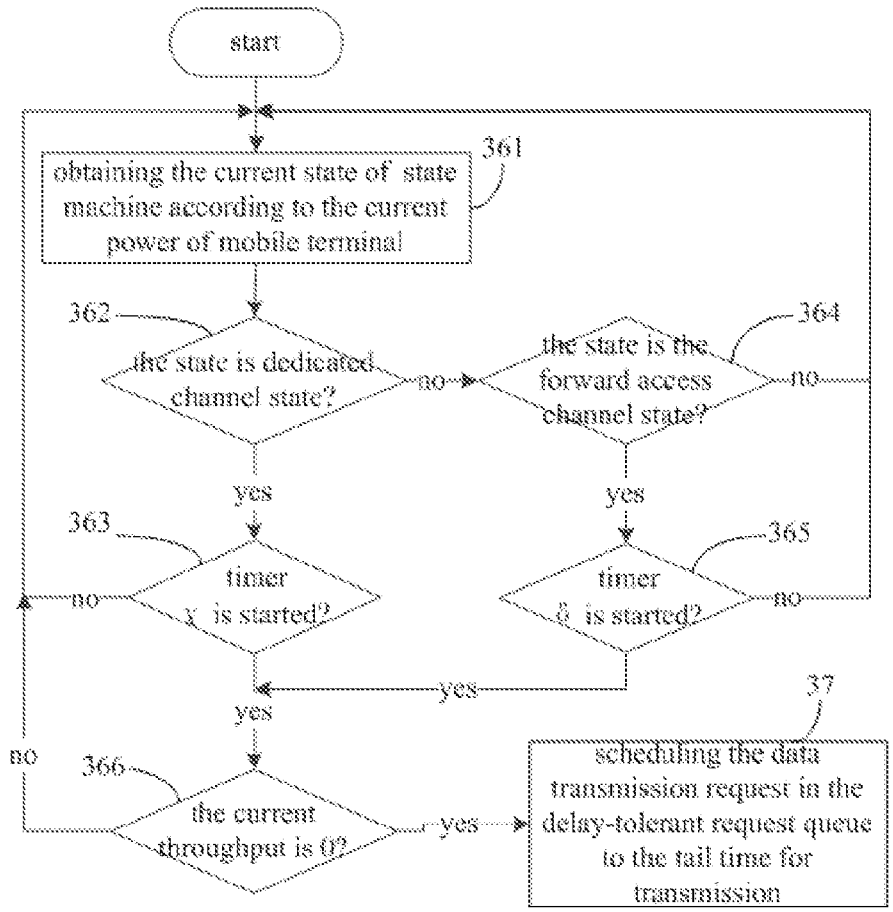
FIG. 6 is a flow chart of determining whether the tail time is available for transmitting data according to an embodiment of the present disclosure.

In the above step 36, it is judged whether the tail time is available for transmitting data based on the principle that: if the current state is the dedicated channel state, the tail time is available for transmitting data only when the corresponding timer γ is in the started state and the current throughput is 0; if the current state is the forward access channel state, the tail time is available for transmitting data only when the corresponding timer δ is in the started state and the current throughput is 0. Specifically, as shown in FIG. 6, judging whether the tail time is available for transmitting data comprises the following steps.

At step 361, the current state of the RRC state machine is obtained according to the current power of the mobile terminal.

At step 362, it is judged whether the current state of the RRC state machine is the dedicated channel state, and if yes, execute step 363, and if no, execute step 364.

At step 363, it is judged whether the timer γ is started, and if yes, execute step 366, and if no, return to step 31.

At step 364, it is judged whether the current state of the RRC state machine is the forward access channel state, and if yes, execute step 365, and if no, return to step 31.

At step 365, it is judged whether the timer δ is started, and if yes, execute step 366, and if no, return to step 31.

At step 366, it is judged whether the current throughput of the mobile terminal is zero, and if yes, execute step 37, and if no, return to step 31.

Figure 7:
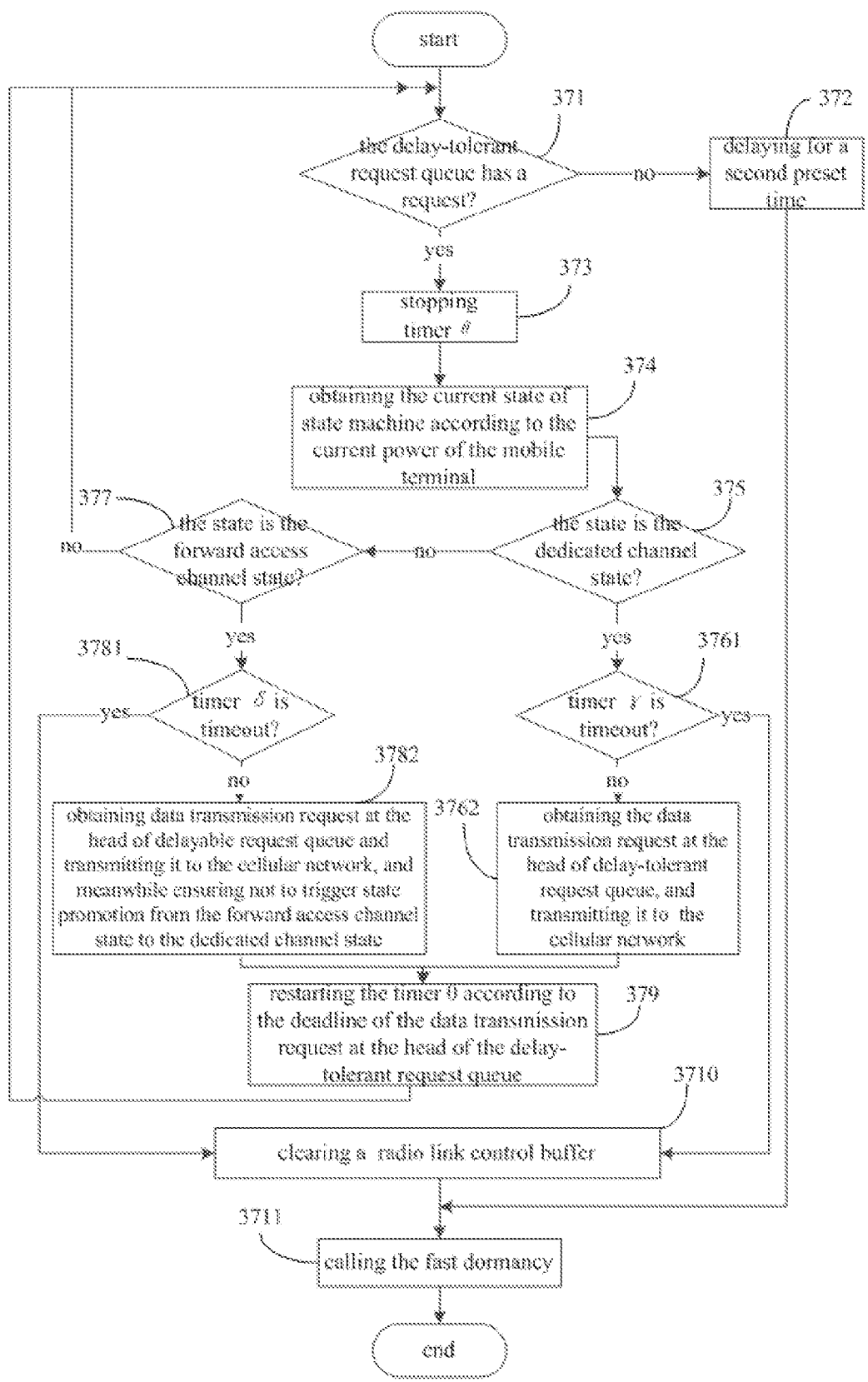
FIG. 7 is a flow chart of scheduling the data transmission request in a delay-tolerant request queue to the tail time for transmission according to an embodiment of the present disclosure.

Specifically, as shown in FIG. 7, scheduling the data transmission request in the delay-tolerant request queue to the tail time for transmission comprises the following steps.

At step 371, it is judged whether the delay-tolerant request queue has a data transmission request, and if no, execute step 372, and if yes, execute step 373.

At step 372, a second preset time is delayed and then fast dormancy is called. In one embodiment of the present disclosure, the second preset time is a fixed value, which can be obtained by analyzing the network flow of the mobile terminal.

At step 373, the timer θ is stopped.

At step 374, the current state of the sate machine is obtained according to the current power of the mobile terminal.

At step 375, it is judged whether the current state of the state machine is the dedicated channel state, if yes, the data transmission request is scheduled to the tail time under the dedicated channel state, and if no, execute step 377.

Specifically, as shown in FIG. 7, scheduling the data transmission request to the tail time under the dedicated channel state comprises the following steps.

At step 3761, it is judged whether the timer γ is timeout, if no, execute step 3762, and if yes, execute step 3710.

At step 3762, the data transmission request at the head of the delay-tolerant request queue is obtained and transmitted to the cellular network.

At step 377, it is judged whether the current state of the RRC state machine is the forward access channel state, if no, return to step 371, and if yes, execute step 3781.

At step 3781, it is judged whether the timer δ is timeout, if no, execute step 3782, and if yes, execute step 3710.

At step 3782, the data transmission request at the head of the delay-tolerant request queue is obtained and transmitted to the cellular network, and meanwhile it is ensured not to trigger a state promotion from the forward access channel state to the dedicated channel state.

In one embodiment, as shown in FIG. 7, after step 3762 and step 3782, a step 379 of restarting the timer θ according to the deadline of the data transmission request at the head of the delay-tolerant request queue is executed and then execute step 371.

At step 3710, wait for clearing the radio link control buffer, which is realized by delaying a maximum buffer consumption time (1.2674s calculated according to parameters listed in Table 1) of the radio link control buffer in one embodiment.

At step 3711, fast dormancy is called.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for transmitting data using a tail time in a cellular network, comprising steps of:
   S1: receiving a data transmission request from a mobile terminal, and inserting the data transmission request into a real-time request queue or a delay-tolerant request queue according to a type of the data transmission request;
   S2: determining a tail time according to a state of a RRC (Radio Resource Control) state machine and a throughput of the mobile terminal; and
   S3: obtaining the data transmission request to be transmitted from the real-time request queue or the delay-tolerant request queue, and transmitting the real-time data transmission request directly as there are real-time data transmission requests in the real-time request queue, and transmitting the delay-tolerant data transmission request using the tail time when the tail time is available for transmitting data or transmitting the delay-tolerant data transmission request directly when a deadline of the delay-tolerant data transmission request is approached, wherein the data transmission request comprises a real-time request and a delay-tolerant request, the delay-tolerant request comprises a delay-tolerant request of a delay-tolerant application and a prefetching request of a prefetchable application; and the type and delay-tolerant time of the data transmission request are added in a data transmission request submission interface of the mobile terminal so as to classify the data transmission requests,
   wherein the method further comprises: sending two data packets intermittently to obtain parameters including a throughput threshold for triggering state demotion from the dedicated channel state to the forward access channel state, a threshold of an uplink buffer, a threshold of a downlink buffer, a buffer consumption time of the uplink buffer and a buffer consumption time of the downlink buffer,
   wherein step S2 comprises:
   S21: obtaining a current state of the RRC state machine according to a current power of the mobile terminal;

S22: judging whether the current state of the RRC state machine is the dedicated channel state, and if yes, executing S23, and if no, executing S28;

S23: judging whether a current throughput of the mobile terminal is less than the throughput threshold for triggering state demotion from the dedicated channel state to the forward access channel state, and if yes, executing S24, and if no, executing S26;

S24: judging whether the timer γ is started, and if yes, executing S214, and if no, executing S25;

S25: starting the timer γ and then executing S214;

S26: judging whether the timer γ is started, and if yes, executing S27, and if no, executing S214;

S27: stopping the timer γ and then executing S214;

S28: judging whether the current state of the RRC state machine is the forward access channel state, and if yes, executing S29, and if no, executing S214;

S29: judging whether the current throughput of the mobile terminal is zero, and if yes, executing S210, and if no, executing S212;

S210: judging whether the timer δ is started, and if yes, executing S214, and if no, executing S211;

S211: starting the timer δ, and then executing S214;

S212: judging whether the timer δ is started, and if yes, executing S213, and if no, executing S214;

S213: stopping the timer δ and then executing S214;

S214: delaying for a first preset time and then returning to S21, in which a period after starting and before timeout of the timer γ and a period after starting and before timeout of the timer δ is the tail time.

2. The method according to claim 1, further comprising: setting three timers θ, γ and δ, wherein each of the three timers has three states: an un-started state, a started but not timeout state and a timeout state, the timer θ is configured to ensure that the delay-tolerant request in the delay-tolerant request queue is transmitted before a deadline, the timer γ and the timer δ are corresponding to a dedicated channel state and a forward access channel state of the RRC state machine respectively, and are configured to determine the tail time and to judge whether the tail time is available for transmitting data.

3. The method according to claim 2, wherein the data transmission request comprises data to be transmitted, the type and the delay-tolerant time of the data transmission request, and the step S1 comprises:

S11: judging whether the type of the data transmission request is the real-time request when the data transmission request is received, and if yes, executing S12, and if no, executing S13;

S12: inserting the data transmission request into a tail of the real-time request queue;

S13: judging whether the timer θ is started, and if yes, executing S14, and if no, executing S15;

S14: stopping the timer θ and then executing S15;

S15: obtaining the deadline of the data transmission request according to the delay-tolerant time of the data transmission request and a current time, and inserting the data transmission request into the delay-tolerant request queue in accordance with the deadlines of the data transmission requests in the delay-tolerant request queue;

S16: obtaining the data transmission request at a head of the delay-tolerant request queue, and starting the timer θ according to the deadline of the data transmission request at the head of the delay-tolerant request queue to update the timer θ.

4. The method according to claim 1, wherein the step S3 comprises:

S31: judging whether the timer θ is started, and if yes, executing S32, and if no executing S34;

S32: judging whether the timer θ is timeout, and if yes, executing S33, and if no, executing S34;

S33: processing the data transmission request at the head of the delay-tolerant request queue, and then returning to S31;

S34: judging whether the real-time request queue has the data transmission request, and if yes, executing S35, and if no, executing S36;

S35: fetching the data transmission request at the head of the real-time request queue, transmitting the data transmission request at the head of the real-time request queue to the cellular network, and then returning to S31;

S36: judging whether the tail time is available for transmitting data, and if yes, executing S37, and if no, returning to S31;

S37: scheduling the data transmission request in the delay-tolerant request queue to the tail time for transmission and then returning to S31.

5. The method according to claim 4, wherein processing the data transmission request at the head of the delay-tolerant request queue comprises:

S331: obtaining the data transmission request at the head of the delay-tolerant request queue;

S332: judging whether the data transmission request at the head of the delay-tolerant request queue is the prefetching request, and if yes, executing S333, and if no, executing S334;

S333: discarding the data transmission request at the head of the delay-tolerant request queue and then executing S335;

S334: transmitting the data transmission request at the head of the delay-tolerant request queue to the cellular network and then executing S335;

S335: restarting the timerθ according to the deadline of the present data transmission request at the head of the delay-tolerant request queue, and then returning to S31.

6. The method according to claim 4, wherein judging whether the tail time is available for transmitting data comprises:

S361: obtaining the current state of the RRC state machine according to the current power of the mobile terminal;

S362: judging whether the current state of the RRC state machine is the dedicated channel state, and if yes, executing S363, and if no, executing S364;

S363: judging whether the timerγ is started, and if yes, executing S366, and if no, returning to S31;

S364: judging whether the current state of the RRC state machine is the forward access channel state, and if yes, executing S365, and if no, returning to S31;

S365: judging whether the timer δ is started, and if yes, executing S366, and if no, returning to S31;

S366: judging whether the current throughput of the mobile terminal is zero, and if yes, executing S37, and if no, returning to S31.

7. The method according to claim 6, wherein scheduling the data transmission request in the delay-tolerant request queue to the tail time for transmission comprises:

S371: judging whether the delay-tolerant request queue has a data transmission request, and if yes, executing S373, and if no, executing S372;

S372: delaying for a second preset time and then calling fast dormancy;
S373: stopping the timer θ;
S374: obtaining the current state of the RRC state machine according to the current power of the mobile terminal;
S375: judging whether the current state of the RRC state machine is the dedicated channel state, and if yes, executing S376;
S376: scheduling the data transmission request to the tail time under the dedicated channel state.

8. The method according to claim 7, wherein scheduling the data transmission request to the tail time under the dedicated channel state comprises:
S3761: judging whether the timer γ is timeout, and if no, executing S3762;
S3762: obtaining the data transmission request at the head of the delay-tolerant request queue, and transmitting the data transmission request at the head of the delay-tolerant request queue to the cellular network.

9. The method according to claim 7, further comprising:
S377: judging whether the current state of the RRC state machine is the forward access channel state when the current state of the RRC state machine is not the dedicated channel state, and if yes, executing S3781;
S3781: judging whether the timer δ is timeout, and if no, executing S3782;
S3782: obtaining the data transmission request at the head of the delay-tolerant request queue, transmitting the data transmission request at the head of the delay-tolerant request queue to the cellular network, and ensuring not to trigger a promotion from the forward access channel state to the dedicated channel state.

10. The method according to claim 8, further comprising:
restarting the timer θ according to the deadline of the data transmission request at the head of the delay-tolerant request queue after transmitting the data transmission request at the head of the delay-tolerant request queue to the cellular network.

11. The method according to claim 8, further comprising:
S379: calling fast dormancy after a radio link control buffer is cleared when the timer γ is not timeout.

12. The method according to claim 9, further comprising:
restarting the timer θ according to the deadline of the data transmission request at the head of the delay-tolerant request queue after transmitting the data transmission request at the head of the delay-tolerant request queue to the cellular network.

13. The method according to claim 9, further comprising:
calling fast dormancy after a radio link control buffer is cleared when the timer δ is not timeout.

14. A non-transitory computer readable storage medium, stored with a computer program or computer executable instructions for executing a method for transmitting data using a tail time in a cellular network, wherein the method comprises steps of:
S1: receiving a data transmission request from a mobile terminal, and inserting the data transmission request into a real-time request queue or a delay-tolerant request queue according to a type of the data transmission request;
S2: determining a tail time according to a state of a RRC state machine and a throughput of the mobile terminal; and
S3: obtaining the data transmission request to be transmitted from the real-time request queue or the delay-tolerant request queue, and transmitting the real-time data transmission request directly as there are real-time data transmission requests in the real-time request queue, and transmitting the delay-tolerant data transmission request using the tail time when the tail time is available for transmitting data or transmitting the delay-tolerant data transmission request directly when a deadline of the delay-tolerant data transmission request is approached,
wherein the data transmission request comprises a real-time request and a delay-tolerant request, the delay-tolerant request comprises a delay-tolerant request of a delay-tolerant application and a prefetching request of a prefetchable application; and the type and delay-tolerant time of the data transmission request are added in a data transmission request submission interface of the mobile terminal so as to classify the data transmission requests,
wherein the method further comprises: sending two data packets intermittently to obtain parameters including a throughput threshold for triggering state demotion from the dedicated channel state to the forward access channel state, a threshold of an uplink buffer, a threshold of a downlink buffer, a buffer consumption time of the uplink buffer and a buffer consumption time of the downlink buffer,
wherein step S2 comprises:
S21: obtaining a current state of the RRC state machine according to a current power of the mobile terminal;
S22: judging whether the current state of the RRC state machine is the dedicated channel state, and if yes, executing S23, and if no, executing S28;
S23: judging whether a current throughput of the mobile terminal is less than the throughput threshold for triggering state demotion from the dedicated channel state to the forward access channel state, and if yes, executing S24, and if no, executing S26;
S24: judging whether the timer γ is started, and if yes, executing S214, and if no, executing S25;
S25: starting the timer γ and then executing S214;
S26: judging whether the timer γ is started, and if yes, executing S27, and if no, executing S214;
S27: stopping the timer γ and then executing S214;
S28: judging whether the current state of the RRC state machine is the forward access channel state, and if yes, executing S29, and if no, executing S214;
S29: judging whether the current throughput of the mobile terminal is zero, and if yes, executing S210, and if no, executing S212;
S210: judging whether the timer δ is started, and if yes, executing S214, and if no, executing S211;
S211: starting the timer δ, and then executing S214;
S212: judging whether the timer δ is started, and if yes, executing S213, and if no, executing S214;
S213: stopping the timer δ and then executing S214,
S214: delaying for a first preset time and then returning to S21, in which a period after starting and before timeout of the timer γ and a period after starting and before timeout of the timer δ is the tail time.

* * * * *